(12) United States Patent
Yoshida et al.

(10) Patent No.: US 6,464,739 B2
(45) Date of Patent: Oct. 15, 2002

(54) ELECTRODE FOR ELECTROLYTIC CAPACITOR AND PROCESS OF PRODUCING THE SAME

(75) Inventors: Tsunenori Yoshida, Yawata; Kenji Hoshino, Kobe; Masakazu Tanahashi, Osaka; Yoshihiro Higuchi, Otsu, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/816,224

(22) Filed: Mar. 26, 2001

(65) Prior Publication Data

US 2002/0071236 A1 Jun. 13, 2002

Related U.S. Application Data

(62) Division of application No. 09/549,491, filed on Apr. 14, 2000, now Pat. No. 6,351,371.

(30) Foreign Application Priority Data

Apr. 16, 1999 (JP) ............................................. 11-109246

(51) Int. Cl.⁷ ............................. H01G 9/00; H01G 9/04; B22E 5/00
(52) U.S. Cl. .......................... 29/25.03; 419/2; 361/508; 361/528
(58) Field of Search ................. 419/2; 29/25.01–25.03; 361/508–510, 528–529; 428/79–80

(56) References Cited

U.S. PATENT DOCUMENTS

| | | | |
|---|---|---|---|
| 3,889,257 A | 6/1975 | Millard et al. | 29/25.03 |
| 4,059,887 A | 11/1977 | Galvagni | 29/25.03 |
| 4,085,435 A | 4/1978 | Galvagni | 361/535 |
| 4,090,231 A | 5/1978 | Millard et al. | 361/529 |
| 4,945,452 A | 7/1990 | Sturmer et al. | 361/529 |
| 5,394,295 A | 2/1995 | Galvagni et al. | 361/303 |
| 5,486,977 A * | 1/1996 | Hasegawa | 361/529 |
| 5,584,890 A * | 12/1996 | MacFarlane et al. | 29/25.03 |
| 5,850,591 A * | 12/1998 | Sugikawa | 428/553 |
| 6,110,417 A * | 8/2000 | Sugikawa | 419/2 |

FOREIGN PATENT DOCUMENTS

| | | |
|---|---|---|
| JP | 50-36951 | 4/1975 |
| JP | 57-138330 | 8/1982 |
| JP | 58-187136 | 12/1983 |
| JP | 59-187129 | 12/1984 |
| JP | 63-283012 | 11/1988 |
| JP | 4-164308 | 6/1992 |
| JP | 10-074668 | 3/1998 |

* cited by examiner

Primary Examiner—Ha Tran Nguyen
(74) Attorney, Agent, or Firm—Wenderoth, Lind & Ponack, L.L.P.

(57) ABSTRACT

An anode for an electrolytic capacitor includes a porous body having micropores that include a dielectric layer filled thereon and an electrolyte filled therein. The porous body includes a laminate of a plurality of sinter layers having the micropores formed from valve metal particles. The laminate includes alternating smaller micropore-size regions and larger micropore-size regions, which form electric conductive passages between the smaller micropore-size regions and side surfaces of the porous body. This structure reduces resistance of the capacitor and also increases capacitance by effectively utilizing the capacitance of the smaller micropore-size regions. The porous body is formed by stacking a plurality of porous preforms, such as sheets preformed of valve metal powder, into a laminate, and then sintering the laminate. The porous body may be joined with a valve metal substrate during sintering, thereby completing the anode for an electrolytic capacitor. Particularly, the porous body may be a laminate including larger micropore-size sinter layers and smaller micropore-size sinter layers, by alternatively laminating two types of preforms, each having a different density.

21 Claims, 7 Drawing Sheets

ELECTRODE FOR ELECTROLYTIC CAPACITOR AND PROCESS OF PRODUCING THE SAME

This application is a divisional application of application Ser. No. 09/549,491, filed Apr. 14, 2000 now U.S. Pat. No. 6,351,371.

BACKGROUND OF THE INVENTION

1. Field of the Invention

The present invention relates to an electrode for electrolytic capacitor and a process of producing the same.

2. Prior Art

Electrolytic Capacitors have historically been increased in capacitance—higher and higher capacitance in smaller and smaller packages. Electrolytic capacitors are often used on the secondary side of a smoothing circuit of direct power supply to assist the promptly starting operation of a central processing unit used for computers such as personal computers. Such capacitors are, in particular, required to have excellent high-frequency properties when dealing with the discharging of a large current to the units.

Various improvements have been made in the electrodes, particularly anodes, to be used in such electrolytic capacitors, to meet these requirements. For aluminum electrolytic capacitors, in which usually an anode is formed of aluminum foil subjected to surface area-enlarging treatment by etching, it has been proposed to form finer capillaries in the metal foil by stepping up the etching level. The etched anode metals are anodized to form a dielectric layer on a micropore surface having increased area in the anode metal foil. Thus, the increased surface area of the dielectric layer results in an increased capacitance of the capacitor.

A tantalum capacitor utilizes, as the electrode, a porous body made by sintering fine powder of metal tantalum, which has valve metal function. The porous electrode has micropores in the porous body and can have significantly great specific surface area. By anodizing the metal porous body, the dielectric layer is formed on the inner surface of the micropores, obtaining a large surface area. The provision of capacitance on the entire surface of the micropores enables the total capacitance of the capacitor to be increased.

Figure 8:
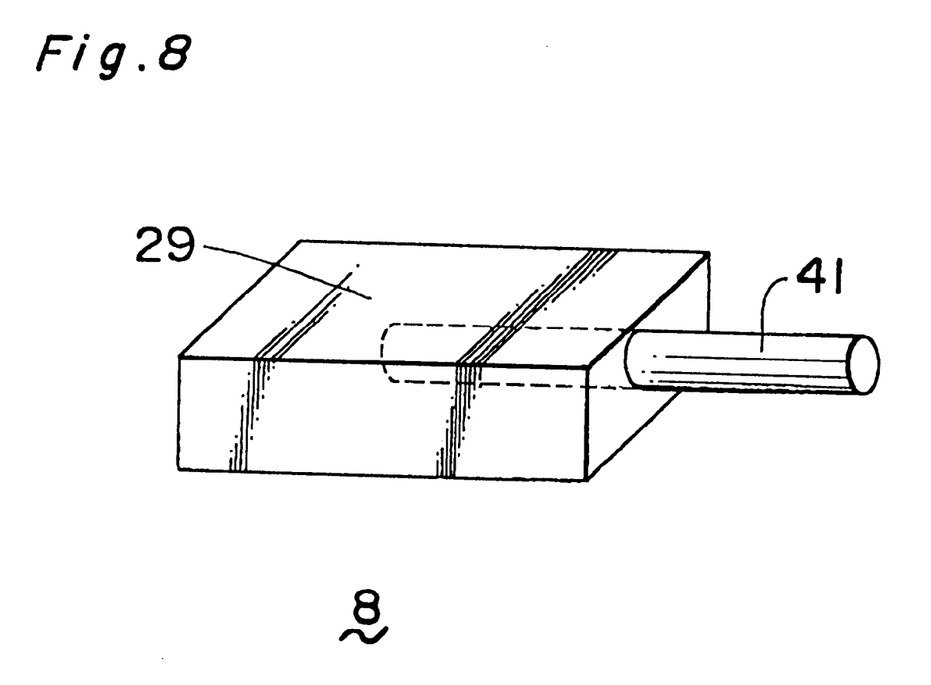
FIG. 8 is a schematic view showing a prior art tantalum pellet for an electrolytic capacitor.

Capacitor electrodes made from a fine powder of a metal that has valvular function such as tantalum, aluminum and niobium are disclosed in, for example, Japanese Patent Publication No. 63-283012, Japanese Utility Model Publication Nos. 57-138330, 58-187136, and 59-187129. The capacitor electrodes disclosed in these publications are made by planting a lead wire 41 in a sintered porous body 29 as an anode made from fine powder of a metal that has valvular action, as shown in FIG. 8. In addition, the publications quoted above have proposed that a portion of the porous body, at which the lead is embedded, should be worked thin and flat, that the embedded portion of the lead is limited to some length, and that the porous body is limited to a certain degree of flatness at the portion where the lead 16 is embedded in the sintered body.

Now a conventional method commonly employed to manufacture a tantalum capacitor will be described below. A block has been compressed from a metal tantalum fine powder having micropores corresponding to a high specific surface area having a grade of about 30000 $\mu F \cdot V/g$ of equivalent capacitance per unit weight, in specified dimensions and is sintered to a porous body for use as an anode. Then a dielectric layer has been formed on the porous body in a known manner by anodizing. At this time, the micropores of the porous body formed by the dielectric layers are filled with an electrolyte of, for example, manganese dioxide. Then, the tantalum capacitor has been completed by attaching a cathode-connecting electrode to the porous body in known manner.

In order to provide a capacitor having higher capacitance, a tantalum capacitor of higher capacitance should have been achieved by sintering a metal tantalum having greater specific surface area of the micropores corresponding to an equivalent capacitance of, for example, 50000 $\mu F \cdot V/g$, to form the similar dimensions of a block as those described above.

Actually, the tantalum capacitor produced using the fine powder of 50000 $\mu F \cdot V/g$ did not have a capacitance as high as expected from the equivalent capacitance of a non-sintered metal tantalum capacitor, and the high-frequency characteristic of the capacitor was lowered unsatisfactory. Thus, the tantalum capacitor produced using the fine powder of 50000 $\mu F \cdot V/g$ had an undesirable characteristic for carrying a large current.

Such insufficient capacitance of the electrolytic capacitor of the prior art is considered to be caused primarily by the insufficient filling of the electrolyte in the micropores of the porous body to be make the anode. That is, the electrolyte that substantially performs the function of the anode does not sufficiently reach the dielectric layers of the micropores, and therefore the micropores are not fully utilized to provide capacitance.

A second reason is that the porous body has not been provided with sufficient surface area of the electrolyte as a cathode disposed on the body surface to be jointed and covered with the cathode-connection electrode of a internal contact layer, such as silver-containing conductive resin through a graphite layer in direct contact with the cathode. As such, the contact resistance between the electrolyte and the cathode-connection electrode have been increased. Thus, equivalent series resistance of the total conventional capacitor could not decrease, resulting in a poor high-frequency characteristic.

In order to overcome the above problems, it was necessary to fill the electrolyte into the micropores in the porous body and increase outer surface area of the valve metal porous body to connect with the cathode-connection electrode, then to make the equivalent series resistance lower.

SUMMARY OF THE INVENTION

An object of the present invention is to provide an anode for use in an electrolytic capacitor that has a high capacitance and excellent high-frequency characteristic, while being capable of carrying a large current.

Another object of the present invention is to provide a process of producing said electrode.

In the anode for an electrolytic capacitor of the present invention, laminated regions of larger-size micropores are established in a porous body of valve metal in order to establish electric current passages to reach fine size micropore regions, which can exhibit high capacitance, thereby, reducing the inner resistance and increasing the capacitance for the electrode.

Further, in the anode for an electrolytic capacitor of the present invention, side surfaces of the porous body are expanded by linear recesses and/or projections, such as grooves or corrugations, formed on the side surfaces of the porous body. The increased area of the outer surface can reduce the contact resistance between the porous body and a cathode-connecting electrode material attached on the outer surface to be connected to a cathode lead.

In this description, an anode for an electrolytic capacitor comprises at least a porous body of a valve metal as an anode of a capacitor, and may include a valve metal substrate for an anodic electrical collector.

To realize such an anode for an electrolytic capacitor in the present invention, the porous body of valve metal may includes a laminate of a plurality of sinter layers having micropores. In this case, the laminated regions of larger-sized micropores are formed more in the vicinity of the interfaces between the adjacent sinter layers than inside each of the sinter layers. The larger micropore-size regions close to the interfaces, when filled with solid electrolyte, establish electric current passages to the inner region of the sinter layers, thereby reducing inner resistance.

Such a laminate in the porous body may be formed by sintering a laminate composed of a plurality of preforms, which are previously formed from a powder of valve metal.

In another aspect of the invention, the larger micropore-size regions and the smaller micropore-size regions may be at least two types of sinter layers, wherein certain properties differ quantitatively.

The larger micropore-size regions may comprise the sinter layers having large micropores, which are made contact with other sinter layers having smaller micropores. The larger micropore-size sinter layers and the smaller micropore-size sinter layers are laminated of preforms having large micropores of a valve metal powder and preforms having small micropores of the same, respectively.

The laminate may include a larger micropore-size sinter layer as a first type of sinter layer and a smaller micropore-size sinter layer as a second type of sinter layer, which are laminated in contact with each other, wherein at least one side of a first type of layer making contact with a side of the other type of sinter layer. The larger micropore-size sinter layers provided in the porous body may be capable of being filled with a solid electrolyte so as to be used for current passages to decrease inner resistance. The smaller micropore-size sinter layers, which increase the capacitance because of high specific surface area of micropore in the layer, increase the total capacitance of the porous body, and reduce the inner resistance.

The laminate of the porous body may include sinter layers, each having a different density from the others. In this anode, the laminate may include high density sinter layers and low-density sinter layers, which are laminated in contact with a high density sinter layers.

Furthermore, in the anode of the present invention, the laminate of the porous body may be formed of sinter layers having a higher specific surface area and sinter layers having a lower specific surface area.

In the invention, the porous body preferably may have corrugated surfaces for connection with a cathode connecting electrode to decrease the contact resistance therewith. For this purpose, a laminate of two types of preforms, each having a different thermal shrinkage ratio during sintering, may be sintered into sintered layers in the porous body.

A process of fabricating such a laminate may comprise sintering a laminate of a plurality of preforms, which are prepared from at least two types of preforms having different properties.

In another process of-the present invention, the plurality of preforms may include the first type of preforms and the second type of performs having preform densities different from each other. The two types of preforms are laminated and the laminate is sintered, to fabricate the porous body.

In a process of producing such a porous body, at least two types of preforms, which are made from valve metal powders having different specific surface areas of the micropores per unit weight, is laminated in a laminate, and sintered into a porous body.

Particularly, the anode for an electrolytic capacitor of the present invention may be produced by sintering a laminate of two types of preforms made from powders of secondary particles having different physical strengths agglomerated from primary particles of a valve metal.

Further, it is preferable that the preforms are made sufficiently thin in the shape of a plate or sheet, and the porous body is joined with a valve metal substrate, or metal foil, so that the valve metal foil is disposed substantially in parallel to the sinter layers formed of the preforms. Alternatively, the valve metal substrate may be disposed substantially perpendicular to the sinter layers.

Further, in the process, the preforms may include plates or sheets formed of valve metal powder. The plates or sheets may be stacked on the substrate of valve metal foil, the laminate being sintered as a whole. In another process, first the porous body may be formed by sintering the laminate bf the preforms, and then the sintered porous body is joined, either in parallel or perpendicularly, with the valve metal substrate.

BRIEF DESCRIPTION OF THE DRAWINGS

The present invention will be described in detail below with reference to the following drawings, as follows.

PREFERRED EMBODIMENT OF THE INVENTION

A basic structure of an anode for an electrolytic capacitor of the invention comprises a porous body of valve metal of laminated sinter layers which has a great number of micropores in mutual communication. The laminated sinter layers are formed by sintering a laminate of preforms.

The preforms may be formed from a powder of valve metal, and into a desired shape. As a valve metal, tantalum, titanium, niobium etc. may be used for the anode. The powder may include refined particles of the metal having a complicated configuration with very large specific surface area on each particle. Tantalum may preferably be referred to as the example of valve metal, and such a metal powder may be supplied from the potassium reduction process using a potassium tantalum fluoride material. The preform may be thin in a plate or sheet shape, favorably to be less than 1 mm thick. The thin preforms may be made by pressing the powder in a press, maintaining a suitable porous state.

In a process of producing such an anode for an electrolytic capacitor, a method of fabricating the porous body comprises: forming porous preforms from powders of valve metal; stacking a plurality of the porous preforms into a laminate; and sintering the preform laminate at a sintering temperature to form a porous body.

Figure 1A:
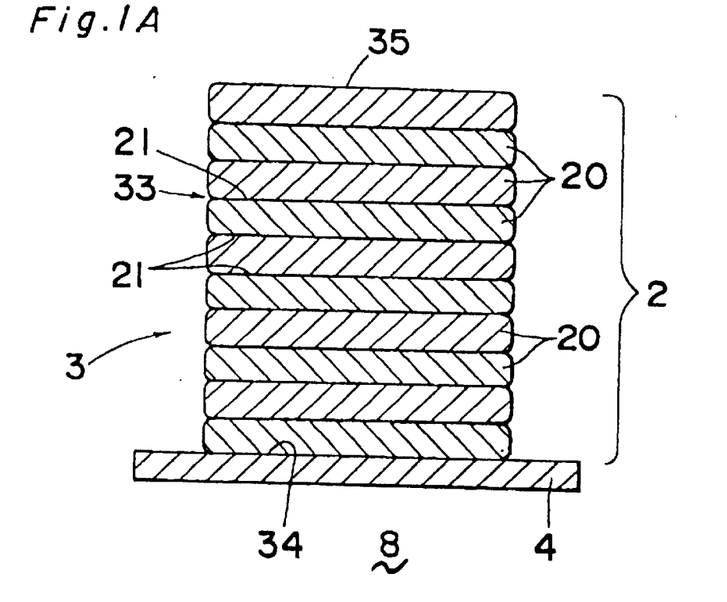
FIG. 1A is a sectional view showing an anode for an electrolytic capacitor according to an embodiment of the present invention.
Figure 1B:
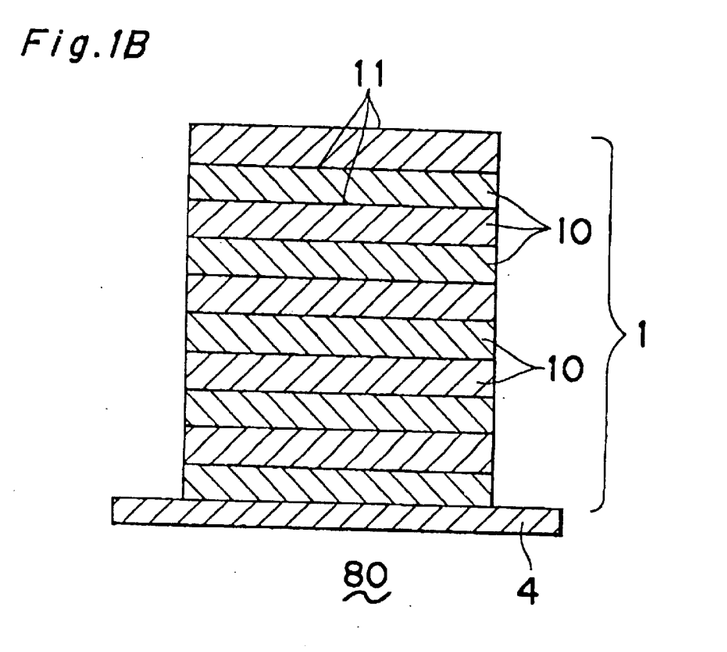
FIG. 1B shows the sectional view of the laminate which is stacked with a plurality of thin preforms according to an embodiment of the present invention.

As an example, as shown FIG. 1A, the structure of the electrode 8 includes a porous body 2 having micropores and a valve metal substrate 4, which may be of foil, joined therewith, wherein the porous body 2 is laminated with a plurality of inter layers 20 corresponding to preforms 10 stacked as shown in FIG. 1B.

Figure 3:
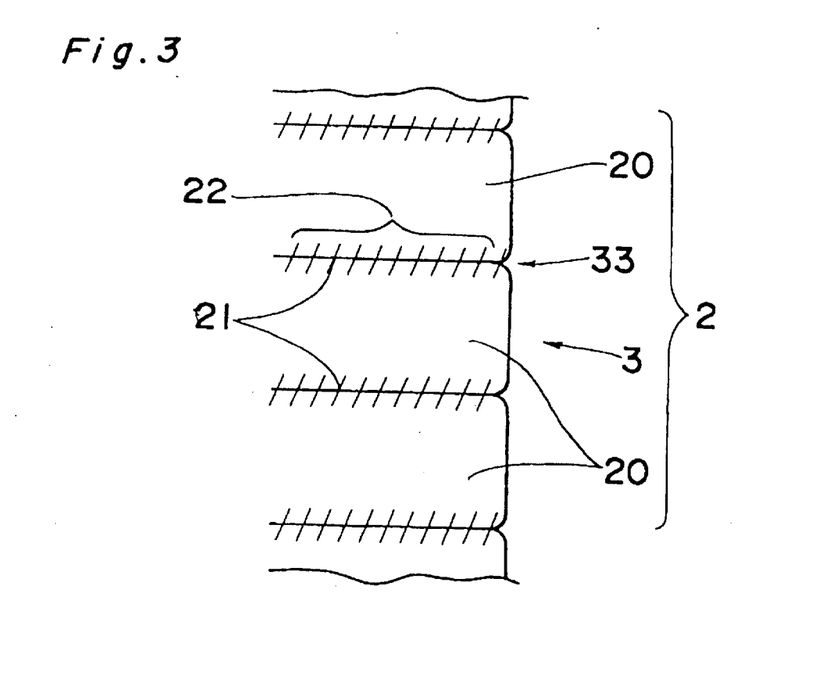
FIG. 3 is an schematically enlarged sectional view showing a porous body sintered of a preform laminate according to an embodiment of the present invention.

The sintered porous body 2, as shown in FIG. 3, has larger micropore-size regions 22 being in lower density in the vicinity of a jointed interface 21 sintered at which two of the sinter bypass 20 are joined with each other, as compared to an inner region of each sinter layer 20. The larger-sized micropores in the larger micropore-size region 22 on, and close to, the jointed interface region are easily capable of being filled with solid electrolyte sufficiently in the electrolyte filling step, so that the electrolyte can pass through the relatively large sized micropores in the larger micropore-size region 22 close to the jointed interface 21, thereby allowing the smaller-sized micropores in each sinter layer to be filled sufficiently with the electrolyte. The larger micropore-size regions 22 around the interfaces 21 can function to provide a low resistance current passage, and the smaller-sized micropores in the each sinter layer 20 provides high capacitance due to its large specific surface area filled with the electrolyte. Thus the layered porous body of the electrode of the present invention exhibits properties of both low inner resistance and high capacitance.

In the present invention, by sintering the laminate of the plurality of preforms 10 as shown in FIG. 1B, thin parallel groves 33 may be formed on the external, side surfaces 3 of the sintered porous body 2, as shown in FIG. 1A, along lines of the joint interfaces 21 due to laminating surfaces 11 of the preforms 10, depending on such conditions as sintering temperatures, sintering time, the nature of the powder and preform density. As a result of the expansion of the side surfaces 3 of the porous body 2, which are to be joint areas joining with a cathode-connecting electrode, the contact area of a cathode connecting electrode that attaches to the side surface 3 is increased, then allowing the capacitor to reduce in contact resistance at the cathode-connecting electrode. Thus, high-frequency characteristics are improved. Further, inner resistance is lowered due to the presence of larger micropore-size regions.

Figure 2A:
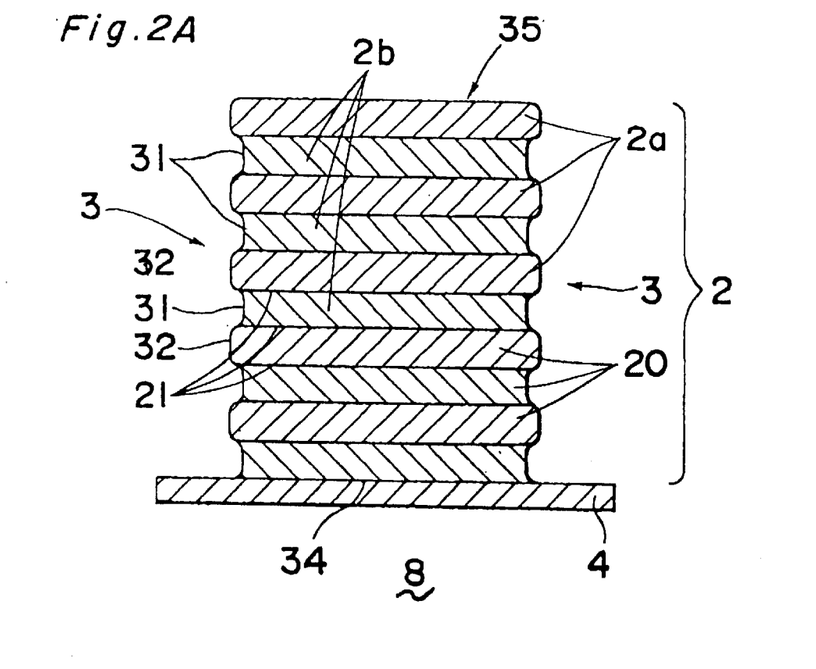
FIG. 2A is a sectional view showing the anode for an electrolytic capacitor having a porous body sintered according to another preferable embodiment of the present invention.
Figure 2B:
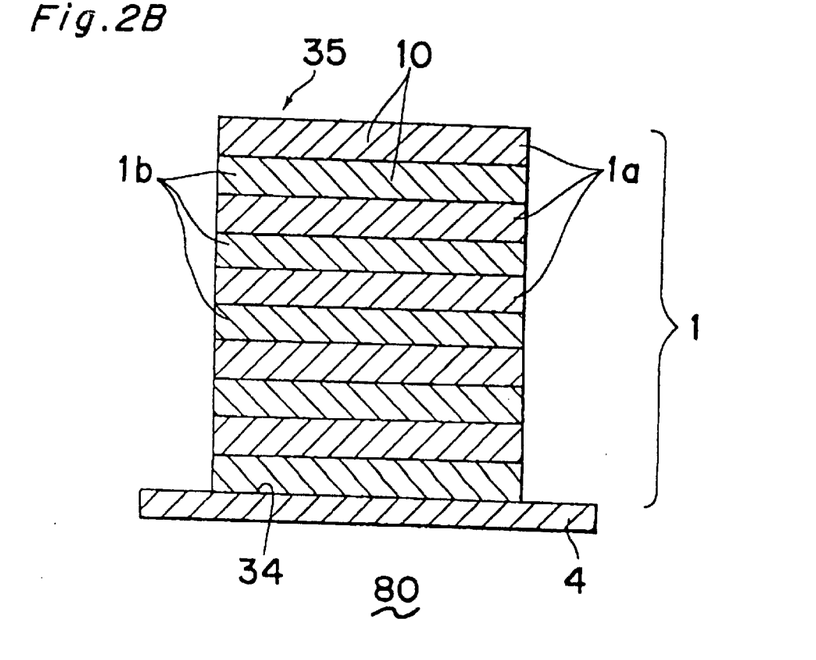
FIG. 2B is the sectional view of the laminate which is stacked with a plurality of two types of thin preforms according to the an embodiment of the present invention.
Figure 2C:
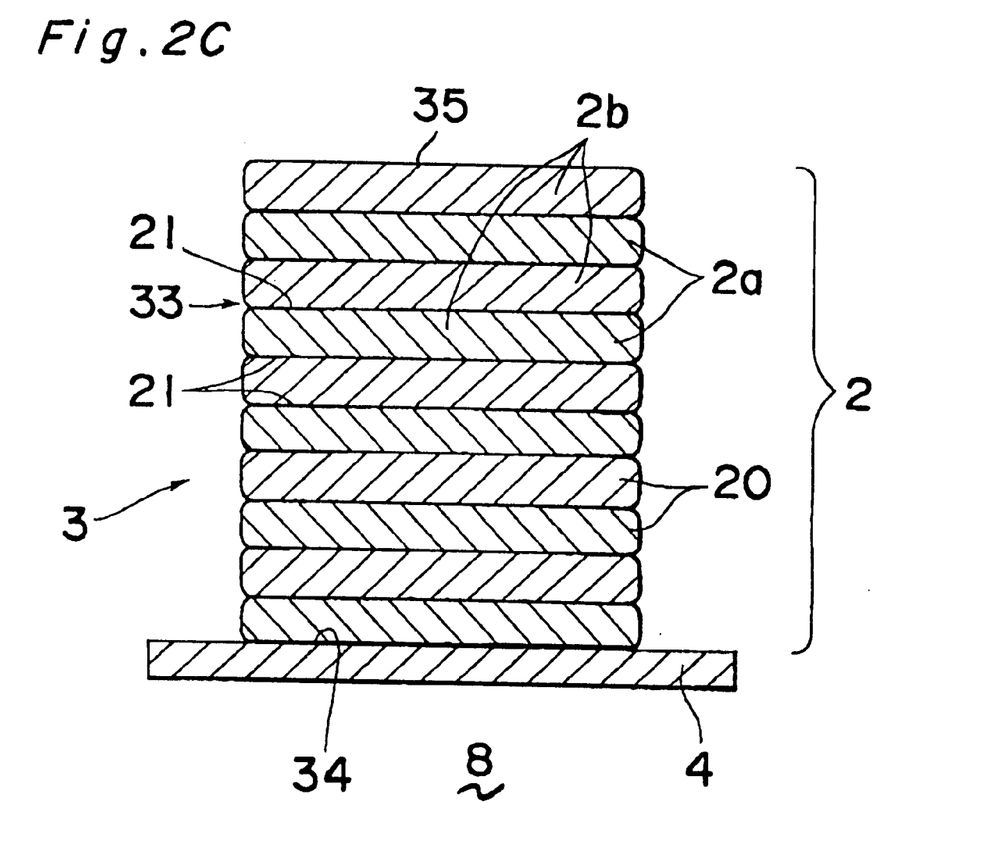
FIG. 2C is a sectional view showing the anode for an electrolytic capacitor having a porous body according to another embodiment of the present invention.
Figure 4:
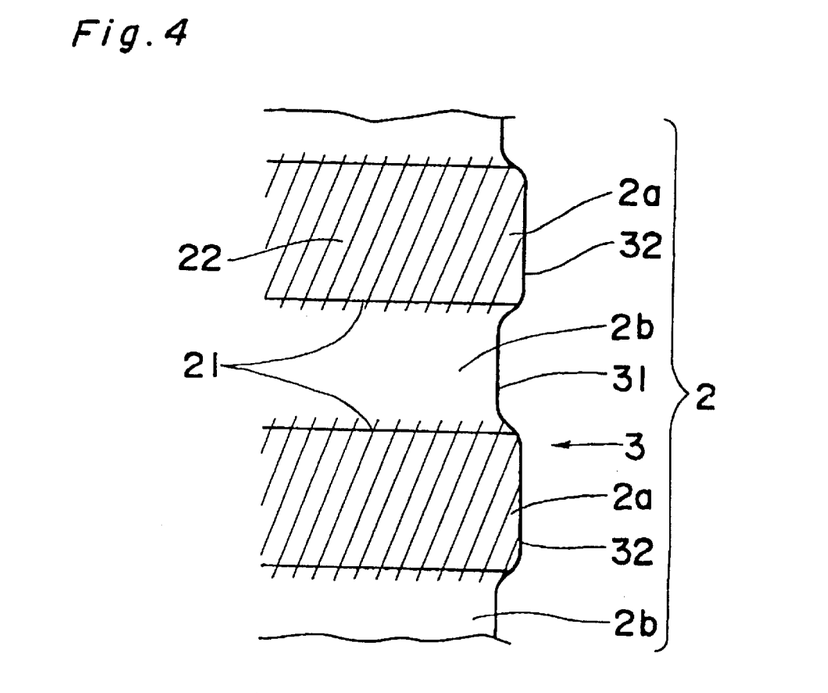
FIG. 4 is an schematically enlarged sectional view showing an porous body sintered of a preform laminate of two types of preforms according to an embodiment of the present invention.

In another embodiment of the invention, it is preferable that two types of the sinter layers having quantitatively different properties may be used to establish the larger micropore-size laminar regions in the sintered laminate. Such properties may be selected from different micropore sizes in the sinter layers, i.e., the first type of sinter layer 2a may be set to be larger micropore-size sinter layers (enlarging the larger micropore-size regions as shown in FIG. 4) and the second type of sinter layer 2b to be smaller micropore-size sinter layers, and the larger micropore-size sinter layers may be readily impregnated with an electrolyte to decrease inner resistance between the side surface 3 of porous body 2 and the smaller micropore-size sinter layers 2a (the second type of the sinter layers 2b) as shown in FIGS. 2A, 2C and 4. The smaller micropore-size sinter layers have high capacitance density and are sufficiently filled with the electrolyte through the larger pored-sinter layers, thereby increasing the capacitance due to high specific surface in the smaller micropore-size sinter layers.

As example of micropore sizes, the smaller micropore-size sinter layers may have 0.05 to 0.3 $\mu$m and the larger micropore-size sinter layer may have 0.3 to 1.5 V$\mu$m represented by peak value of pore size distribution in a layer. The pore size are expressed by the peak value of the measured micropore size distribution by the traditional mercury microporosimeter technique and the ratio of the peak values of micropore sizes of the smaller micropore-size sinter layer to the larger micropore-size sinter layer may preferably be set to be in a range of 1.2 to 5.0.

The laminate of the porous body may be formed of low-density sinter layers of a first type of sinter layer 2a and high-density sinter layers of a second type of sinter layer 2b. Wherein the low-density sinter layers function as the larger pore size sinter layer, as mentioned above, which are sufficiently filled with an electrolyte to be used for current passages to decrease inner resistance. The the high-density sinter layers function as the smaller micropore-size sinter layers, which increase the capacitance. Further, the high-density sinter layers and the low-density sinter layers are alternately laminated on one another to form the laminate.

The first type and the second type of sinter layer may have a sinter layer density ratio of 1.1 to 3.0. The high density sinter layers may preferably be in range of 5.5 to 7.5 g/cm$^3$ and the low density sinter layers may be in the range of 2.5 to 5.5 g/cm$^3$, which exhibit larger micropore-size in the layers for the low resistance passages.

The porous body made of such a laminate comprising two types of sinter layers may preferably have corrugated surfaces, having linear recesses 31 and/or projections 32 on the side surfaces 3 of the porous body, which is to be attached to a cathode-connecting electrode, as shown in FIGS. 2A and 4.

In an anode for an electrolytic capacitor in the invention, the porous body may be made by sintering the stack of two types of preforms 1a and 1b having different qualities such as densities, i.e., lower density preforms as the first type of preform 1a with micropores of a larger pore size, and higher density preforms as the second type of preform 1b with micropores of a smaller size. Thus, the micropores in the sinter layers 2a of lower density can be sufficiently filled with the electrolyte.

Also, the sinter layer of lower density (from first type of preform 1a) experiences smaller amount of shrinkage than the sinter layer of higher density (from second type of preform 1b) after sintering at low sintering temperatures. This results in a corrugation of the external surface, i.e., linear recesses 31 due to the low density sinter layers (the first type of the sinter layer 2a) and linear projections 32 due to the high density-sinter layers (second type of layers 2b) on the side surface 3 in a direction of the joint interfaces 21 layered in the porous body 2 as shown in FIG. 4. Surface area of the side surfaces 3 of the porous body 2 may be increased 1.2 to 1.6 times as much as that of a flat area of the side surface without any surface corrugation, decreasing the contact resistance between the side surface and the cathode connecting electrode.

Part of the sinter layers may have lower specific surface area of micropores as the first type of sinter layer, functioning as larger pore-sized sinter layers having the electric current passages for reducing the inner resistance. Thus, the second type of sinter layer having the higher specific surface area have a function of increasing capacitance. In order to fabricate this anode, a laminate of at least two types of preforms having different specific surface areas of micropores per unit weight is used with preforms being stacked alternately and sintered. The first type of preform 2a having smaller specific surface area of the micropores, which have larger particles of valve metal, can be less easily sintered at low sintering temperatures than the second type of preform 2b of larger specific surface area of the micropores as discussed above, and then thermal shrinkage ratio of the first of preform to the second type during sintering is smaller accompanied by micropores of larger size, and therefore the first type of preform 2a can be projected as a line on the side surfaces after sintering, resulting in corrugation of the outer surface of the porous body.

Thus, the porous body for the anodic electrode may comprise a laminate by laminating layers, which are sintered from two valve metals that have different thermal shrinkage ratios during sintering of the preforms. The two type of perform may be pressed from valve metal particles different in particle size, being stacked alternately on one another, and then incorporated sintering.

Figure 5A:
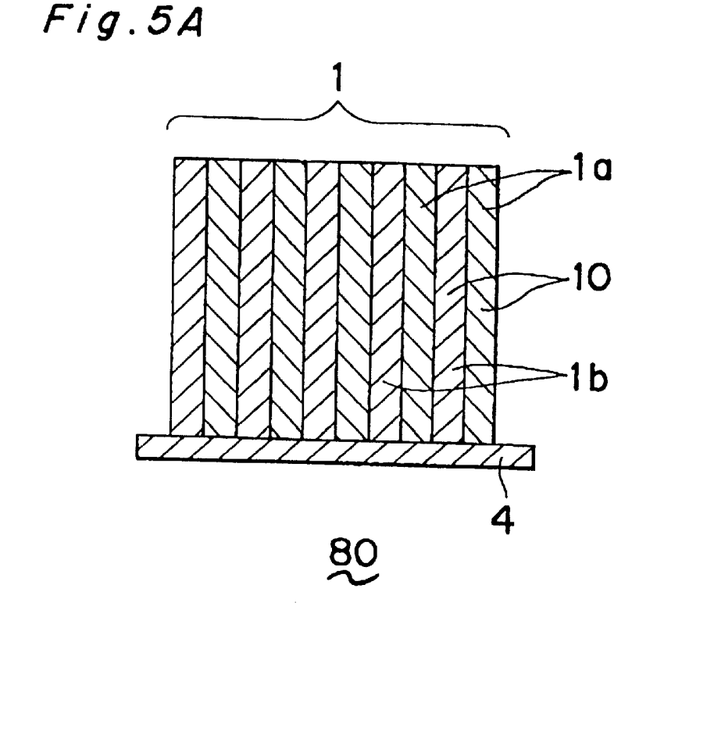
FIG. 5A is a sectional view of a laminate of the thin preform and a metal foil attached to the laminate according to an embodiment of the present invention.
Figure 5B:
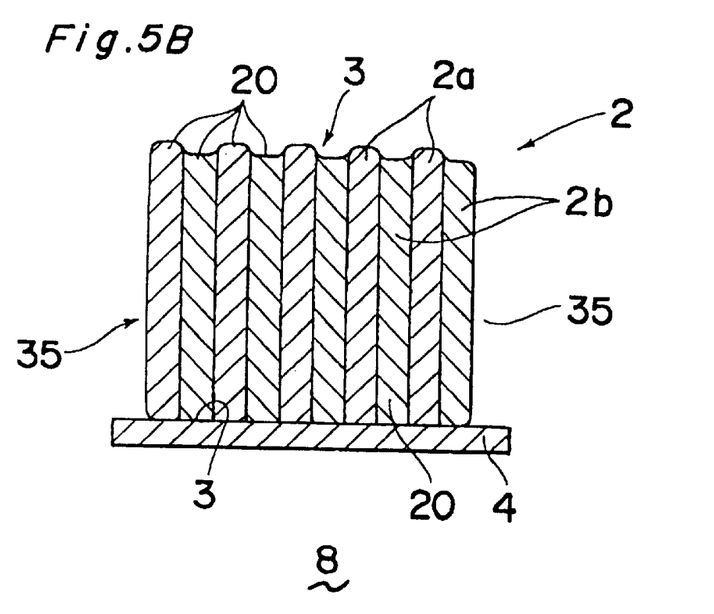
FIG. 5B is a sectional view of an electrode including a porous body sintered according to an embodiment of the present invention.

The laminate sintered from the sinter layers 20 may be joined with the valve metal substrate 4 for an anodic electrical collector, and the sinter layers 20 may preferably be parallel to the valve metal substrate 4, as shown in FIGS. 1A and 2A and 2C, i.e., the substrate 4 for the anodic electrical collector is attached to the stacking surface 34 of the porous body 3. Alternatively, the sinter layers 20 of the laminate may be perpendicular to the valve metal substrate 4 as shown in FIGS. 5A and 5B, i.e., the substrate 4 is attached to one of the side surfaces 3 of the porous body. In these cases, a foil, a sheet, or a plate of valve metal is used as a valve metal substrate 4. Preferably, the valve metal for the substrate may be tantalum.

In addition, the side surfaces 3 of the porous body 2 comprising two types of the sinter layers may be flat with some narrow grooves as shown in FIG. 2C, similarly to FIG. 1A, without having any such deep corrugation above as shown in FIG. 2A. Such phenomena may occur in the case of substantially equal shrinkage between the first type and second type of sinter layers during the sintering of the corresponding types of preforms in lamination while the grooves are formed along the joint interfaces between the adjacent sinter layers.

A process of producing an anode for an electrolytic capacitor in the present invention, the porous body being joined to a valve metal foil, comprises: forming a plurality of porous preforms from powder of valve metal; laminating the plurality of preforms to form a laminate; and sintering the laminate to sinter layers incorporated in the sintered laminate to make the porous body. The resulting porous body is composed of a plurality of sinter layers made by sintering the stacked preforms, and has micropores in each sinter layers, which are to be formed with a dielectric layer in the micropores that are then filled with an electrolyte.

In this process, the preforms may preferably be prepared by forming a powder of the valve metal as sheet or plate form. For the powder material, tantalum powder, e.g., a powder having high specific surface area which is made by means of potassium reduction of sodium tantalum fluoride may be used. Sheets or plates as preforms preferably may be produced by compressing the powder in a press into thin compacts having suitable density and thickness of the preforms, for example, of 1 mm or less, particularly, less than 0.5 mm or, particularly, 0.5 mm to 0.05 mm.

A method may be adopted to produce another kind of preform from a slurried or binderized sheet containing a valve metal powder such as tantalum powder.

In laminating, the suitable number of preforms are stacked in a laminate to provide a desirable capacitance for a fabricated capacitor. The preforms may be laminated on a substrate of valve metal, which may typically be used for an anodic electrical collector. The multilaminated preforms 10 may be parallel (as shown in FIGS. 1B and 2B) or perpendicular (as shown in FIG. 5A) to the substrate 4 surface and after sintering the porous body 2 is joined with the valve metal substrate 4.

In sintering, the laminated preforms are fired at sintering temperatures of the valve metal, in a vacuum furnace to sinter each of the preforms, thereby producing a porous body comprising sinter layers from the thin preforms. The sintering is accomplished at sintering temperatures suitable for the valve metal, for example, 900 to 1600° C. for tantalum, at which valve metal particles in the preforms are connected with one another leaving a great number of micropores in them, and the preforms are connected with each other into corresponding sinter layers. The sintering temperature may be changed to modify the shrinkage ratio of the preform during sintering, as will be explained.

By the sintering of the preforms, the sintered laminate in the porous body is formed with a smaller micropore-size region within each of the sinter layers and larger micropore-size regions between the two adjacent sinter layers where the sintering action has been slightly insufficient to connect the adjacent preforms with each other during sintering, and the larger micropore-size region and smaller micropore-size region are alternatively repeated to be made into a laminate. As discussed above, in the present invention, the larger micropore-size regions are useful to form electric conductive passages between the smaller micropore-size regions and side surfaces of the porous body.

The porous body produced by this process is provided on the side surfaces with a plurality of linear recesses 31 and/or projections 32 parallel to each other which are formed along a direction of the sinter layers on the surface. The linear recesses may be linear grooves 33 along the opening edges of each of the preforms 10 on the side surface 3 during sintering. Such grooves 33 on the side surfaces 3 of the porous body are useful to increase an contact area of the side surfaces 3 which is to be covered with and in contact to a cathode-connecting electrode 5.

Particularly, in the process, it is desired that the plurality of preforms are composed of at least two types of preforms different quantitatively in properties including density and/or shrinkage, to form a wider larger micropore-size regions, and also to corrugate the side surfaces of the porous body more deeply.

First, the property of preforms of the two types may include a different thermal shrinkage ratio during sintering. In this case, a first type of preform may show large thermal shrinkage ratio and the second type of preform may have small thermal shrinkage ratio which are stacked in contact each other to form the preform laminate. Thereby, the sintered laminate can have side surfaces provided with recesses which have been shrunk relatively deeper corresponding to the first type of preform and with projections which have been shrunk relatively shallower to the second type of the preforms depending on the shrinkage difference between adjacent preforms of the two types under consideration during sintering.

Further, the process may utilize the plurality of preforms including low density performs as a first type of preform and high density preforms as the second type of preform, which, in laminating, are stacked in contact with each other to form the laminate. The densities imparted to the performs can be achieved by controlling the compressing pressures to be added to the powders in forming preforms. The ratio of the high density to the low density in the two types of preforms are set to be in a range of 1.1:1 to 3.0:1. After sintering at relatively low temperatures, low density preforms are changed to low density sinter layers having a larger micropore-size, as compared with high density sinter layers having smaller-size sinter layers from the second type of preform. The sintering at low temperatures allows the density ratios of the preforms to be maintained in a sinter layers corresponding to each of the two types of preforms.

Thus, the sinter layers in the porous body to be divided in two parts of high density regions and low density regions in a multilaminar state. The high density sinter layers may preferably be in range of 5.5 to 7.5 g/cm$^3$, and the low density sinter layers may be in the range of 2.5 to 5.5 g/cm$^3$, which the low density sinter layers exhibit larger micropore-size in the layers for the low resistance passages.

Figure 6:
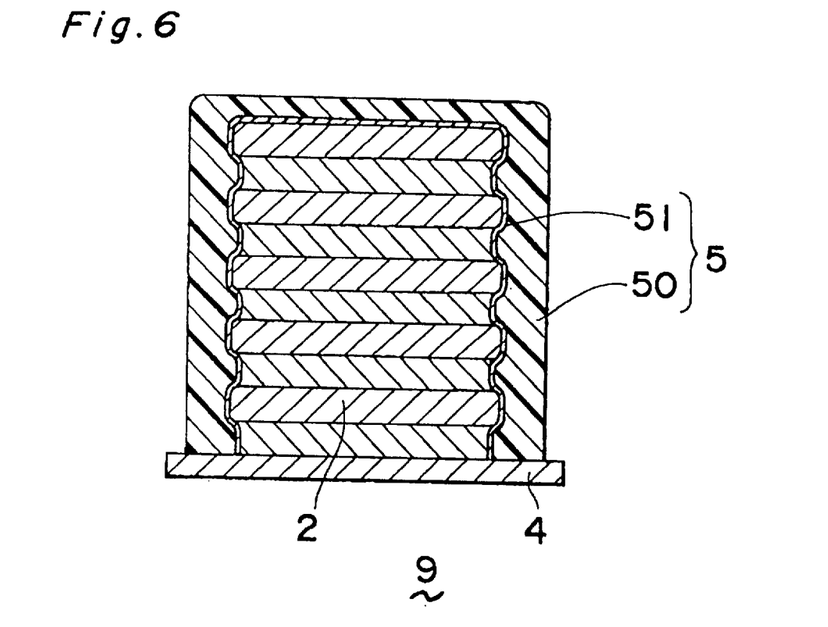
FIG. 6 shows a sectional view of an electrolytic capacitor fabricated from the electrode according to an embodiment of the present invention.
Figure 7:
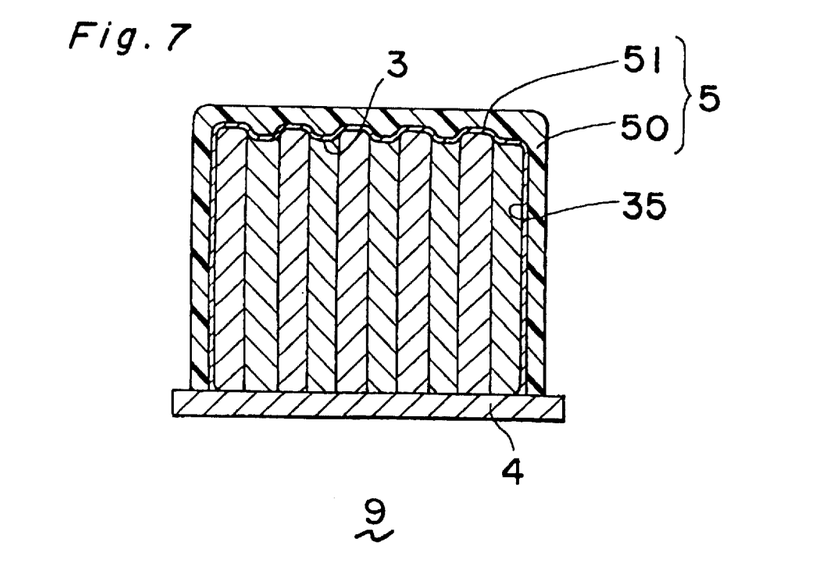
FIG. 7 shows a sectional view of an electrolytic capacitor, similarly to FIG. 6 according to an embodiment of the present invention.

As discussed above, the first type of preform 1a having low density are apt to experiences smaller amount of shrinkage than the second type of preform 1b (the sinter layer of higher density) during sintering at low sintering temperatures and results in deep corrugation of the side surfaces, comprising liner recesses due to the low density-sinter layers 2a and projections due to the high density-sinter layers 2b on the side surface 3 in a direction of the joint interfaces 21 layered in the porous body 2 as shown in FIG. 4 the deep corrugation, thereby, can decrease the contact resistance between the side surfaces 3 and the cathode-connecting electrode 5 in contact to each other as shown in FIGS. 6 and 7.

However, it is noted that, when sintering is carried out at a higher sintering temperature, the projections and recesses have adverse relation with respect to the high density- and low density-sinter layers with same effects as described above. Higher sintering temperatures can promote the sintering of preforms to densify the low density-preforms to ultimate density of solid sintered material, then, the low density-preforms showing greater amount of sinter shrinkage than the high density preforms.

In another embodiment of the process, a plurality of preforms comprise at least two types of preforms different in specific surface areas of micropores per unit weight, and in laminating the first type of performs having low specific surface area and the preforms having high specific surface are stacked one on another to form the laminate.

In this case, for the preforms may be made from two powders different in specific surface areas per unit weight. A powder of tantalum having low specific surface area of micropores per unit weight and the other powder having high specific surface area are pressed to the first and the second types, respectively, of preforms which are laminated alternatively and sintered to a sintered laminate of a porous body. After sintering, the preforms of low specific surface area are changed into a larger micropore-size sinter layers to be used for low electric resistance passages between the smaller micropore-size sinter layers to exhibit high capacitance because of effective utilization of the total high micropore areas existing in the smaller micropore-size sinter layers.

In another process, at least two types of preforms including the first preform and the second preform made from powders of valve metals that have different physical strength of powder, and the first perform and the second preform are stacked on one another to for the laminate.

Particularly, the anode for an electrolytic capacitor of the present invention may be produced by sintering a laminate of two types of preforms made from powders containing the secondary particles having different physical strengths which are agglomerated from primary particles of a valve metal, and the different types of the preforms are alternately laminated on one another.

When a first type of preform 1a is selected from the powder of secondary particles having higher physical strength, which are primary particles that are more strongly calculated by heat treatment, and are less capable of being sintered than the powder of lower physical strength of the second type of preform 1b, then, the thermal shrinkage ratio of the first type of preform 1a is less than the second type of preform 1b while accompanied by larger micropores and produces linear projections 32 on the side surfaces in the porous body. Sinter layers 2a having larger micropores in the porous body are more easily filled with electrolyte, which improves the efficiency of achieving capacitance. As a result, the equivalent series resistance can be reduced by utilizing the inner regions including larger micropores in the porous body and the region of expanded side surface of the porous body in connection with a cathode-connecting electrode.

The porous body so produced for an electrode for an electrolytic capacitor is anodized in an acid solution, such as phosphoric acid, to form a dielectric layer in the sinter layers of the porous body and the substrate for an anodic electrical collector. Thereafter, the porous body is impregnated with a solid electrolyte, preferably such as manganese dioxide. In this case, the anodizes porous body is inserted in a solution of manganese nitrate in water, and then dried and calcined in an oxidizing atmosphere to dissolve the nitrate into manganese dioxide in the micropores. This operation is repeated several times till the oxide is filled almost completely in the micropores in the sinter layers.

The outside of the porous body, which is filled with electrolyte, is covered, as shown in FIGS. 6 and 7, first with a graphite layer 51 applied on the porous body 2, and second with a silver-containing curable paste 50 applied to the graphite layer 51. The layer 51 and paste 50 comprise a cathode connecting electrode 5. Thereafter, the silver-pasted porous body is housed in a metallic conductive can (not shown) but the anodic electrical collector remains exposed outside the can, to obtain a solid electrolytic capacitor 9.

EXAMPLE 1

First, a number of sheet-like preforms are made by pressing fine powder of a valve metal. Then a valve metal foil is ground to make its surface roughened as a substrate 4 for the anodic electrical collector. The preforms 1 are stacked on the substrate 4 for an anodic electrical collector to form a laminate 80. Thereafter, the laminate is sintered to form a porous body 2, thereby completing an electrode 8 for electrolytic capacitor shown in FIG. 1.

In this example, the porous body 2 is constructed by multilaminated thin sinter layers 1. The sinter layers 20 are formed by sintering the stacked preforms above, thereby forming one sintered preform that corresponds to one sinter layer 1.

In the sintered porous body 2, the larger micropore-size regions, in FIGS. 1A and 3, are formed in the vicinity of a joint interface 21 between sinter layers 20 in contact with each other, and are lower in density than the inner regions of the sinter layers 20. The larger micropore-size regions have micropores that are larger in micropore size than the micropores inside the sinter layers 20.

Moreover, since edges of each preform 10 is rounded during sintering, as shown in FIGS. 1A and 3, a narrow grooves 33 is formed in the vicinity of the joint interface 21 between two sinter layers on the side surface 3 of the porous body 2.

A portion interposed between adjacent sinter layers 20 of the porous body 2 made by sintering the laminate formed from a number of preforms 10, namely the larger micropore-size regions 22 at the jointed interfaces 21, has a low density. The micropores formed in this region have larger sizes. In the larger micropore-size regions of lower density, substantial shrinkage occurs after sintering and the shrinkage causes narrow grooves 33 to be formed in the vicinity of the joint interface 21 on the side face of the porous body 2.

In Example 1, electrolytic capacitors are fabricated as follows. A refined powder of metal tantalum in a grade of 70000° F·V/g as a measure of specific surface area was pressed into preforms each measuring 1.0 mm×3.0 mm in size and 0.44 mm in thickness, with ten preforms stacked on a tantalum foil as substrate for an anodic electrical collector and sintered at 1350° C. in high vacuum, thereby making an electrode 8 for an electrolytic capacitor.

Then, the electrode 8 for an electrolytic capacitor was anodized in a phosphoric acid solution maintained at a temperature of about 85° C. with a voltage of 20 V applied to formed a dielectric layer in the sinter layers 20 of the porous body, and manganese dioxide was formed as an electrolyte in the porous body by repeated treatments of dipping it in manganese nitrate solution and calcining to manganese oxide. Further, after providing a cathode connecting electrode 5 consisting of a graphite layer 51 and a conductive resin paste 50 rich in silver particles, an external anode lead and an external cathode lead were connected to the electrode which is molded in a molding resin to complete an electrolytic capacitor. Theoretical capacitance of the electrolytic capacitor made in this process is to be 350 µF.

As a comparative example, a porous body was made by pressing metal tantalum fine powder into a single large preform measuring 1.0 mm×3.0 mm in size and 4.4 mm in thickness was joined with a valve metal foil made roughened the surface thereof by grinding, with this assembly being sintered to make an anode for an electrolytic capacitor. This capacitor electrode will be hereinafter called the comparative electrode. The density of the porous body of the comparative electrode could be substantially equal to that of the porous body of the anode for an electrolytic capacitor.

A comparative electrolytic capacitor also was to have theoretical capacitance of 350 µF, which was made from the comparative electrode in a process similar to the process of making the capacitor in a similar manner of Example 1.

Capacitance was measured at a voltage of frequency of 120 Hz applied thereto and at a voltage at a frequency of 100 kHz applied, and equivalent series resistance at a voltage of resonance frequency of 1 MHz applied was measured. The measure results are set forth in Table 1.

TABLE 1

|  | Capacitance at 120 Hz (µF) | Capacitance at 100 kHz (µF) | Equivalent series resistance (mΩ) |
| --- | --- | --- | --- |
| Present invention | 322 | 110 | 45 |
| Comparative Example | 305 | 83 | 50 |

As is clear from Table 1, the measured capacitance of the capacitor in this example is near the theoretical capacitance and higher than that of the comparative capacitor. The capacitor of this example shows less decrease in capacitance caused by high frequency voltage, as compared with the comparative capacitor. It is also seen that the capacitor of Example 1 has low equivalent series resistance, having excellent high-frequency characteristic and is capable of carrying large ripple current.

The reason for the capacitor of this example, having such a large capacitance is that larger pores are formed in the jointed interface region in the porous body 2 with the dielectric layer formed in the large pores so that almost all the pores existing in the porous body are capable of being used for capacitor.

Also, it is seen that the capacitor in the example has excellent high-frequency characteristic because the grooves are formed on the surface of the porous body leading to an increase in the surface area of the porous body, thereby reducing the equivalent series resistance of the capacitor of the first embodiment.

EXAMPLE 2

In an example of this embodiment, a refined tantalum powder having 70000 µF·V/g of measure of specific surface area per unit weight was used to be pressed into pieces of preforms in a sheet shape of each measuring 1.0 mm×3.0 mm×0.44 mm. Five pieces of a first type of preform with density of 6.0 mg/cm³ and five pieces of the second type of preform 2b with density of 4.4 mg/cm³ were prepared by altering the pressing draft. The first type and second type of preform 2a and 2b are stacked alternately one on another to form a ten-layered laminate on the tantalum foil as a substrate for an anodic electrical collector. This laminate was sintered to make a porous body, thus completing an anode for an electrolytic capacitor of this example. The conditions of sintering the laminate were set similar to those of the first embodiment above.

An electrolytic capacitor having theoretical capacitance of 370 µF is made from the anode for electrolytic capacitor similarly to the first example.

For the comparative example, tantalum fine powder is pressed into a small block measuring 1.0 mm×3.0 mm in size and 4.4 mm in thickness with density of 5.2 mg/cm$^3$, which is sintered to make a porous body. This porous body is joined with a tantalum foil for an anodic electrical collector. Sintering conditions are similar to sintering the porous body of this example.

A comparative electrolytic capacitor is also to have theoretical capacitance of 370 μF and is fabricated from the above comparative electrode in similar manner to the process of making the capacitor of this example.

Table 2 shows resulting capacitance data of the capacitors of this example and the comparative which are evaluated under a voltage at frequencies of 120 Hz and 100 kHz applied thereto, and equivalent series resistance under a voltage of resonance frequency 1 MHz is also evaluated.

TABLE 2

|  | Capacitance at 120 Hz (μF) | Capacitance at 100 kHz (μF) | Equivalent series resistance (mΩ) |
| --- | --- | --- | --- |
| Present invention | 341 | 139 | 40 |
| Comparative Example | 318 | 86 | 55 |

As is clear from Table 2, the capacitor in the second example is larger in capacitance than the comparative capacitor and is near the theoretical capacitance. Also the capacitor of this example experiences less decrease in the capacitance that is caused by application of a high frequency voltage than the comparative capacitor. It is also shown that the capacitor of this example has the equivalent series resistance, thus exhibiting high frequency characteristic with capability of carrying large ripple current.

The reason having a large capacitance is size are formed in the second body of the anode as the large pores are filled pores provide capacitance efficiently.

Also the capacitor of the second example has lower equivalent series resistance because the side face of the first sinter layer becomes concave resulting in an increase in the surface area of the porous body. The reduction in the equivalent series resistance means a improvement of high-frequency characteristic of the capacitor, in the second example. Adhesive strength of the porous body to the cathode-connecting electrode can also be increased due to the recesses and projections on the side surfaces, thereby improving the reliability of delamination resistance between them.

The anode for an electrolytic capacitor in these examples are produced from the porous body made by forming the laminate on a metal foil substrate and then sintering the laminate, but the present invention is not limited to this procedure. Alternatively, the anode for an electrolytic capacitor may be produced by first sintering the laminate to form the porous body, then joining the porous body to the metal foil for electrode.

In the examples described above, preforms of different densities are formed from the same tantalum powder, and are sintered to form the porous body having local differences in the density, the pore size and the thermal shrinkage ratio, but the present invention is not limited to the above conditions. For example, the porous body may also be produced by sintering a laminate formed from a plurality of preforms that are different in the density or the thermal shrinkage ratio which are made by regulating the degree of coagulation of the primary particles or the secondary particles of the tantalum powder and controlling the tantalum powder particle size or bulk density thereof. The preforms may also be made from powders of two or more types of valve metal having different densities or thermal shrinkage ratios. Green sheets may also be used as the preforms.

As described above, the anode for an electrolytic capacitor of the present invention has the porous body formed by stacking a plurality of preforms to make the laminate and sintering the laminate. The porous body has regions of low density and regions of high density, with micropores of a larger size being formed in the regions of low density. When the electrolytic capacitor is made using this electrode, since the larger pores can be sufficiently filled with the electrolyte, an electrolytic capacitor of large capacitance can be obtained. Since the region of higher density has a high thermal shrinkage ratio, grooves are formed on the porous body. Since this increases the surface area of the porous body, connecting resistance with the cathode-connecting electrode is reduced and the equivalent series resistance of the electrolytic capacitor decreases, thus improving the high-frequency characteristic.

What is claimed is:

1. A process of producing an anode for an electrolytic capacitor, the anode comprising a porous body joined to a valve metal substrate, the porous body having micropores and a dielectric layer disposed therein, the micropores having an electrolyte filled therein, said process comprising:

forming a plurality of porous preforms from a powder of valve metal, each of the porous preforms having a shape of a plate or sheet;

laminating the plurality of porous preforms to form a laminate; and sintering the laminate to sinter layers incorporated in the laminate to make the porous body, wherein the sintered laminate comprises at least one smaller micropore-size region disposed between larger micropore-size regions, which form electrically conductive passages from the smaller micropore-size region to side surfaces of the porous body.

2. The process according to claim 1, wherein said sintering of the laminate forms at least one of projections and linear recesses on a side surface of the porous body along a laminating direction of the laminate, and wherein the least one of a plurality of linear recesses and a plurality of projections increases a contact area of the side surface.

3. The process according to claim 2, wherein said forming a plurality of porous preforms comprises forming a plurality of preforms that comprise two types of preforms, wherein each of the types of preforms has a quantitatively different property from the other type of preforms.

4. The process according to claim 3, wherein said laminating comprises:

stacking a first type of preform, having a first thermal shrinkage ratio, on and in contact with a second type of preform, having a second thermal shrinkage ratio that is smaller than the first thermal shrinkage ratio, wherein said sintering provides the sintered laminate with recesses corresponding to the first type of preform and with projections corresponding to the second type of preform by means of a shrinkage difference of the first type of preform and the second type of preform.

5. The process according to claim 3, wherein said laminating comprises:

stacking a first type of preform, having a first thermal shrinkage ratio, on and in contact with a second type of preform, having a second thermal shrinkage ratio that is smaller than the first thermal shrinkage ratio, to form the laminate, wherein said sintering provides the sintered laminate with recesses corresponding to the first type of preform and with projections corresponding to the second type of preform by means of a shrinkage difference of the first type of preform and the second type of preform during sintering.

6. The process according to claim 3, wherein said laminating comprises stacking a first type of preform, having a first density, on and in contact with a second type of preform, having a second density that is larger than the first density.

7. The process according to claim 3, wherein said laminating comprises stacking a first type of preform, having a first density, on and in contact with a second type of preform, having a second density that is larger than the first density, to form the laminate.

8. The process according to claim 3, wherein said laminating comprises stacking a first type of preform, having a first specific surface area of micropores per unit weight, and a second type of preform, having a second specific surface area of micropores per unit weight that is different than the first specific surface area of micropores per unit weight.

9. The process according to claim 3, wherein said laminating comprises stacking a first type of preform, having a first specific surface area of micropores per unit weight, and a second type of preform, having a second specific surface area of micropores per unit weight that is different than the first specific surface area of micropores per unit weight, to form the laminate.

10. The process according to claim 3, wherein said laminating comprises stacking a first type of preform comprising powder of a valve metal having a first physical strength, and a second type of preform comprising powder of valve metal having a second physical strength that is different than the first physical strength.

11. The process according to claim 3, wherein said laminating comprises stacking a first type of preform comprising powder of a valve metal having a first physical strength, and a second type of preform comprising powder of valve metal having a second physical strength that is different than the first physical strength, to form the laminate.

12. The process according to claim 1, wherein said forming comprises pressing valve metal powder into sheets.

13. The process according to claim 12, wherein said laminating comprises stacking the porous preforms on the valve metal substrate.

14. The process according to claim 13, wherein said laminating further comprises disposing the porous preforms such that a stacking direction thereof is substantially parallel to the valve metal substrate, and wherein said sintering comprises joining the porous body with the valve metal substrate.

15. The process according to claim 13, wherein said laminating further comprises disposing the porous preforms such that a stacking direction thereof is substantially perpendicular to the valve metal substrate, and wherein said sintering comprises joining the porous body with the valve metal substrate.

16. The process according to claim 1, wherein said forming comprises pressing valve metal powder into sheets to form the porous preforms, respectively.

17. The process according to claim 16, wherein said laminating comprises stacking the porous preforms on the valve metal substrate to form a laminate for use as an anode.

18. The process according to claim 17, wherein said laminating further comprises disposing the porous preforms such that a stacking direction thereof is substantially parallel to the valve metal substrate, and wherein said sintering comprises joining the porous body with the valve metal substrate.

19. The process according to claim 17, wherein said laminating further comprises disposing the porous preforms such that a stacking direction thereof is substantially perpendicular to the valve metal substrate, and wherein said sintering comprises joining the porous body with the valve metal substrate.

20. The process according to claim 1, wherein said at least one smaller micropore-size regions comprises two smaller micropore-size regions, and wherein the smaller micropore-size regions are separated from one another by one of the larger micropore-size regions.

21. The process according to claim 1, wherein said forming, said laminating, and said sintering, produce a sintered laminate comprising alternating layers of smaller micropore-size regions and larger micropore-size regions.

* * * * *